(12) United States Patent
Salen

(10) Patent No.: US 10,800,355 B2
(45) Date of Patent: Oct. 13, 2020

(54) SEGMENTED LICENSE PLATE CONNECTED DISPLAY DEVICE

(71) Applicant: Yolanda M. Salen, Colonia, NJ (US)

(72) Inventor: Yolanda M. Salen, Colonia, NJ (US)

(*) Notice: Subject to any disclaimer, the term of this patent is extended or adjusted under 35 U.S.C. 154(b) by 0 days.

(21) Appl. No.: 15/236,870

(22) Filed: Aug. 15, 2016

(65) Prior Publication Data

US 2017/0043730 A1 Feb. 16, 2017

Related U.S. Application Data

(60) Provisional application No. 62/205,471, filed on Aug. 14, 2015.

(51) Int. Cl.
| | |
|---|---|
| *G09F 7/00* | (2006.01) |
| *B60R 13/10* | (2006.01) |
| *G09F 7/18* | (2006.01) |
| *G09F 9/30* | (2006.01) |
| *G09F 21/04* | (2006.01) |

(52) U.S. Cl.
CPC .............. *B60R 13/105* (2013.01); *G09F 7/18* (2013.01); *G09F 9/30* (2013.01); *G09F 21/04* (2013.01); *G09F 2007/1843* (2013.01); *G09F 2007/1865* (2013.01); *G09F 2007/1895* (2013.01)

(58) Field of Classification Search
CPC ......... B60R 13/105; B60R 13/10; G09F 7/18; G09F 21/04; G09F 2007/1895; G09F 15/0068; G09F 7/00; G09F 7/08; G09F 7/02; B60Q 1/38; B60Q 1/2661
See application file for complete search history.

(56) References Cited

U.S. PATENT DOCUMENTS

| | | | | |
|---|---|---|---|---|
| 1,464,283 | A * | 8/1923 | Krajeski | B60R 13/10 40/209 |
| 1,575,950 | A * | 3/1926 | Thorn | B60R 13/105 40/202 |
| 2,115,555 | A * | 4/1938 | Kaupert | B60Q 1/34 362/498 |
| 2,622,356 | A * | 12/1952 | Valente | G09F 7/12 40/206 |
| 3,908,296 | A | 9/1975 | Harrison | |
| 4,445,291 | A | 5/1984 | Easley | |
| 5,878,516 | A | 3/1999 | Amirian | |
| 7,594,347 | B2 * | 9/2009 | Anderson | B60R 13/00 40/200 |
| 8,578,640 | B1 | 11/2013 | Krankkala et al. | |
| 8,832,977 | B1 | 9/2014 | Salen | |
| 10,324,366 | B2 * | 6/2019 | Batten | G03B 29/00 |
| 2005/0210720 | A1 | 9/2005 | Burr et al. | |
| 2015/0353032 | A1 * | 12/2015 | Liao | G09F 9/35 345/1.3 |
| 2020/0031293 | A1 * | 1/2020 | Conine | B60R 13/105 |

* cited by examiner

*Primary Examiner* — Cassandra Davis
(74) *Attorney, Agent, or Firm* — Thomas J. Germinario

(57) ABSTRACT

The present invention describes a segmented license plate connection mechanism. The device comprises a conventional display device, which enables a personalized message, image, or video to be displayed adjacent to the entire perimeter of the license plate. A static image may be inserted into the decal enclosure, and is secured by decal stabilization clip. The display device also comprises a USB inlet and source of power that enables users to upload custom media.

2 Claims, 5 Drawing Sheets

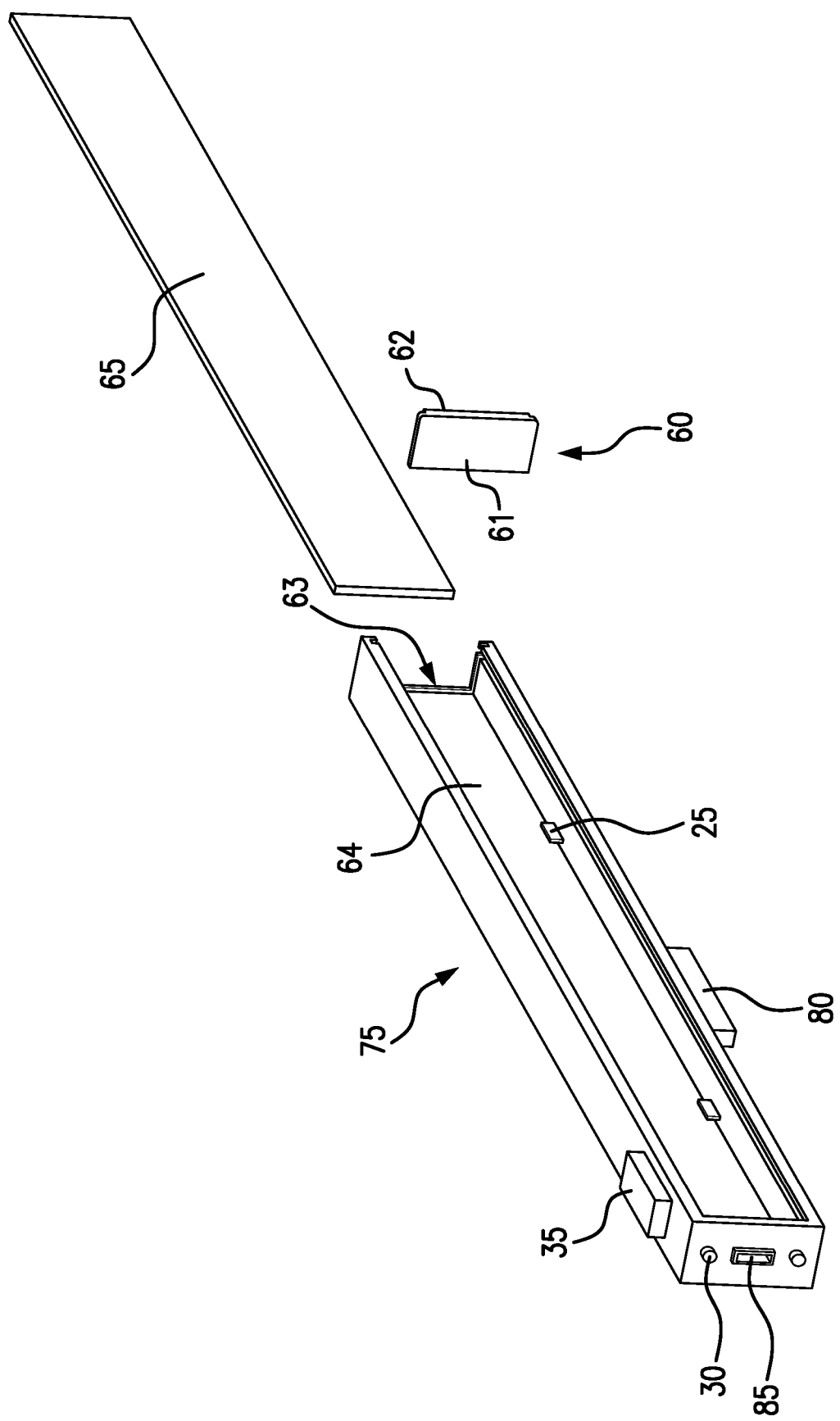

SEGMENTED LICENSE PLATE CONNECTED DISPLAY DEVICE

CROSS-REFERENCE TO RELATED APPLICATION

The present application claims priority to U.S. Provisional Patent Application No. 62/205,471 filed on Aug. 14, 2015, entitled "Squibs in Motion" the entire disclosure of which is incorporated by reference herein.

BACKGROUND OF THE INVENTION

1. Field of Invention

The present invention relates to the field of message and image displaying devices that may be affixed to license plates on automobiles. Further, the invention relates to a device for storing and displaying customizable images or messages that is affixed to the license plate of a vehicle.

2. Description of Related Art

Car owners have long utilized their vehicles as a medium to express free speech and present personal beliefs. For quite some time, people have used bumper stickers, customized license plates, and other means to convey a variety of messages to other cars on the road. Whether it is a sticker alerting the other drivers that a baby is on board, or stickers endorsing a specific local or national political candidate, drivers have taken liberty to utilize their vehicles as a means to make personal statements. Drivers have often used stickers to endorse religious values, portray their family sizes, or to show support for specific movies or memberships to which they are a fan or belong to.

Although bumper stickers have long been used by vehicle owners to provide information to other vehicles, a significant drawback to the use of bumper stickers is that they are constructed to adhere tightly to the vehicle and are not meant for multiple reapplications. If a bumper sticker is left on the car for too long, a residue is permanently left on the vehicle after it is removed. The bumper sticker is also a permanent message, which is incapable of being rendered or altered to convey a different message reflecting different speech.

Improvements upon bumper stickers have led to the use of magnetic signs that can be affixed to the car exterior. Although these magnetic signs solve the issues related to the sticky residue harming the exterior of the car from the bumper stickers, the magnetic signs are costly to create, and are only capable of a static message that can not be amended or changed to reflect current events or different values of the owner.

Based on the foregoing, there is a need in the art for a device that can be affixed or adhered to the license plate of a vehicle, which contains an enclosure for displaying information and/or media that can be viewed by other drivers and passerby.

SUMMARY OF THE INVENTION

The present invention is directed towards a segmented license plate display device, which is used to display media, and images. The license plate connection mechanism can be mechanically fixed to a vehicle license plate, and be used to display digital media or static, analog images. The invention comprises a waterproof seal, a display device, and a means for the connection mechanism to be segmented and affixed to any combination of the four edges surrounding the vehicle license plate.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 5 is an exploded view of the decal enclosure and display device, according to an embodiment of the present invention.

DETAILED DESCRIPTION OF PREFERRED EMBODIMENTS

Figure 1:
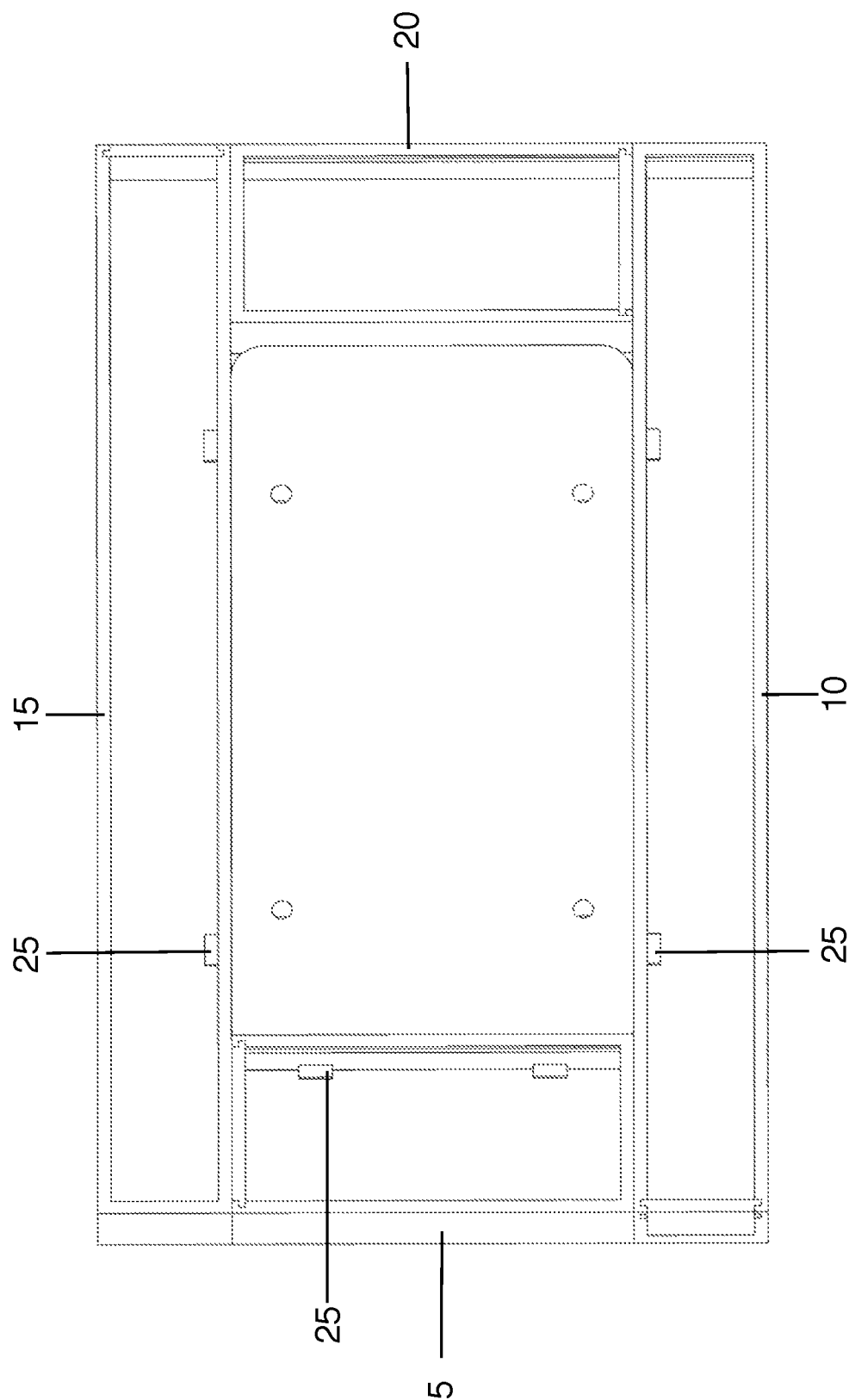
FIG. 1 is a front view of the segmented license plate connection mechanism, and the decal stabilization clip in the segmented license plate connection mechanism, according to an embodiment of the present invention.

Preferred embodiments of the present invention and their advantages may be understood by referring to FIGS. 1-5, wherein like reference numerals refer to like elements.

The device comprises a display device and segmented license plate connection mechanism. It is an aim of the present invention to provide a display device that is capable of being mounted to a license plate at multiple positions. The user may display custom images or messages adjacent to any perimeter wall of a license plate, notably the upper, right, lower, and left edges of the license plate.

In a preferred method of use, the device functions as a frame for images, slogans, and designs. Users first select the area of the license plate they would like customized. Next, the user chooses an appropriately sized display device. The user then disengages a waterproof seal and inserts a desired image into the decal enclosure of the display device. Once the image has been appropriately positioned, the user then reengages the waterproof seal. Using this process, it is possible to seal any appropriately sized image within the display device. The license plate connection mechanism can be affixed to the license plate anywhere around the perimeter of the license plate.

In reference to FIG. 1, a front view of the license plate connection mechanism is shown. The device comprises segmented sections in which the user can affix singularly, or cumulatively to the license plate. In an embodiment, the user could affix the left license plate connection mechanism 5 to display a custom image or message. In alternative embodiments, the user can affix the bottom license place connection mechanism 10, the upper license plate connection mechanism 15, or the right license plate connection mechanism 20. In an embodiment, each segmented license plate connection mechanism can be affixed independently of one another. In certain embodiments, the connection mechanisms may be affixed through a plurality of fasteners to the license plate, or comprise an extended piece or arm that utilizes the existing screw hole of the license plate. This embodiment further steadies the license plate connection mechanism, and will provide for the display device to stay secure during bouts of turbulence, rain, wind, or other environmental factors.

In reference to FIG. 1, each display device will further comprise a decal stabilization clip 25 to prevent the static pictures or images from shifting or moving while the vehicle is in operation or in transit.

Figure 2:
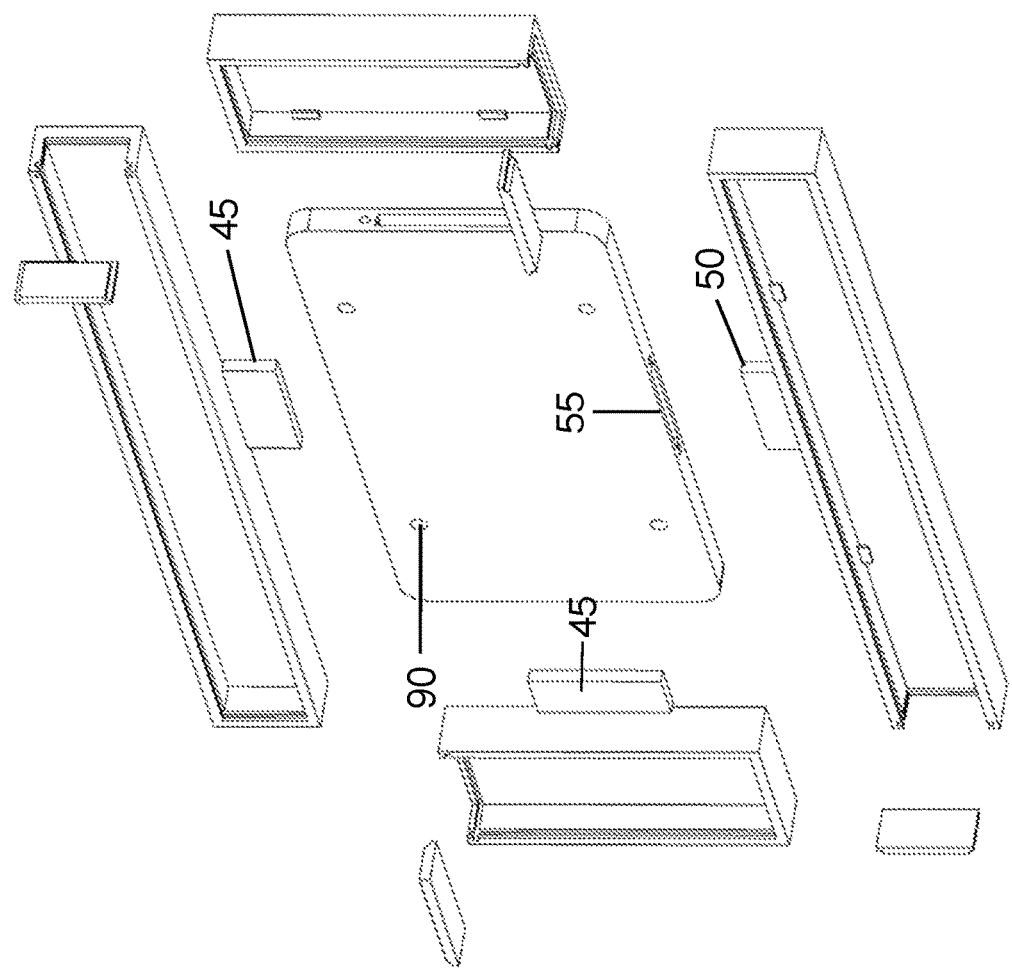
FIG. 2 is an exploded view of the license plate connection mechanism according to an embodiment of the present invention.

With reference to FIG. 2, each license plate connection mechanism will be able to be fastened to the license plate via a number of fastening mechanisms 45. In one embodiment, the connection mechanism may utilize the screw holes of the license plate 90. In another embodiment, the connection mechanism may be designed using fasteners such as, but not limited to, VELCRO® (hook-and-loop fastener), latches, snaps, hooks, pressure pins, and adhesives. Alternative embodiments of the fastening mechanism 50 and 55 can be seen in FIG. 2.

Figure 3:
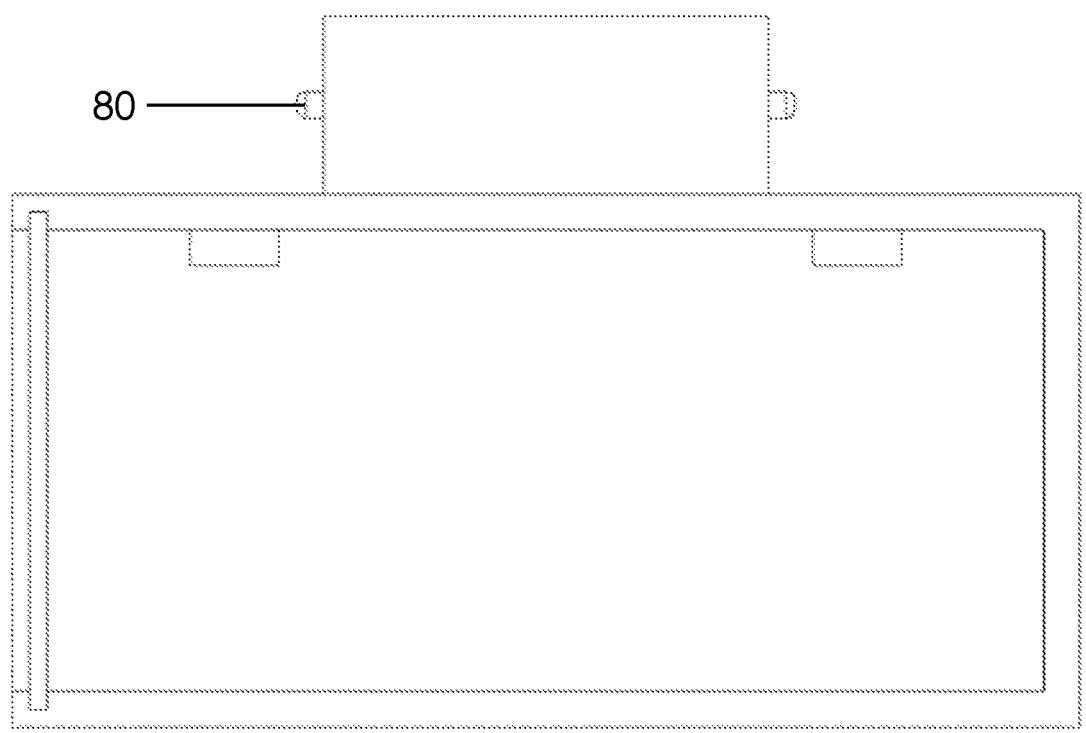
FIG. 3 is a front view of the detachable fasteners, according to an embodiment of the present invention.

FIG. 3 shows pressure pins 80 with spring-loaded technology that can be utilized to fasten the license plate connection mechanism to the license plate of the vehicle.

Figure 4:
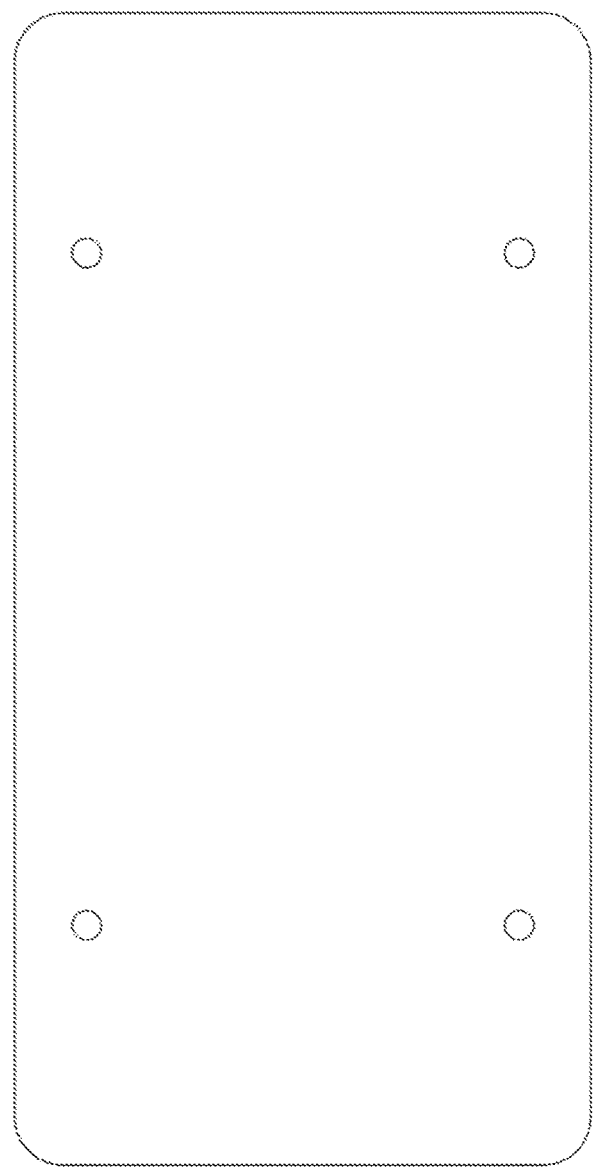
FIG. 4 is a front view of the license plate connection mechanism detachable overlapping appendage flap, according to an embodiment of the present invention.
Figure 4:
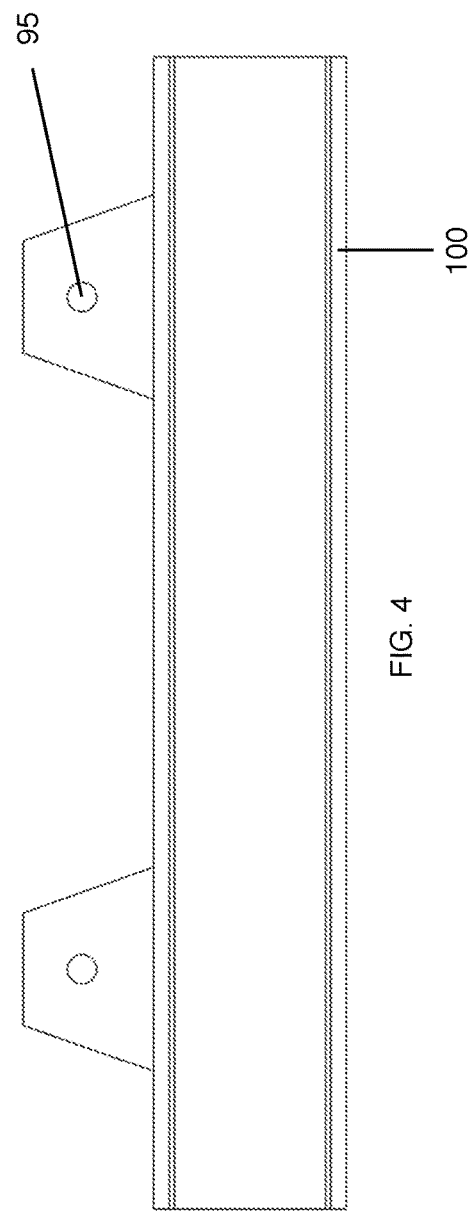

In reference to FIG. 4, the license plate connection mechanism 100 can also utilize detachable overlapping appendage flap 95 to be affixed to the vehicle or license plate through the existing license plate screw holes.

With reference to FIG. 5, embodiments are shown that further depict each license plate connection mechanism having three sides with a supporting frame that is affixed to form a 45 degree angle, and a fourth side which is open, but can be closed via the waterproof seal 60 which locks in place to form a fourth side and holds the transparent cover 65 to completely encapsulate the display device.

In another embodiment as shown in FIG. 5, the display device 75 comprises a means for displaying digital media such as static text, scrolling text, and media such as images and videos. In an embodiment, the user can upload digital media via a USB inlet 85, or via a wireless transmission. The digital display device 75 can draw power from a battery 35 or alternative power source to superimpose scrolling text, custom video, or images.

The display device 75 is in the form of a substantially rigid material having a front surface for displaying a message and a bottom edge, and a supporting frame having a first edge and a second edge, the first and second edges being disposed in different planes and one of the first edge and the second edge being detachably secured to the bottom edge by a plurality of fastening means.

A user may also upload media of their choosing by syncing a smart phone or other digital device to the USB inlet 85. The display device will be able to display digital media that is uploaded via the USB inlet through use of firmware, memory, and a battery, and a lighting system.

Once the display device 75 containing a desired image or message is sealed, the user then may employ the license plate connection mechanism to affix the device to a desired location on the license plate of the vehicle.

In a preferred embodiment of the present invention, the display device comprises a transparent enclosure 65 that can be affixed to the license plate of a car. The display device comprises a decal enclosure, a decal stabilization clip 25, and a waterproof seal 60. It is an aim of the present invention to provide a display device 75 capable of storing and displaying user-selected images. The decal enclosure is a transparent container 65 that envelopes the image a user intends to display.

In a preferred embodiment, a decal stabilization clip 25 is located within the decal enclosure and is used to retain any inserted image in a desired orientation. Separate embodiments are designed with decal stabilization clips that make use of various detachable fasteners such as, but not limited to, VELCRO® (hook-and-loop fastener), latches, snaps, hooks, and adhesives.

In a preferred embodiment, the waterproof seal 60 is positioned on the end of the decal enclosure 64 opposite the license plate connection mechanism. The waterproof seal 60 comprises a cap 61, a locking mechanism 62, and a decal opening 63. It is an aim of the present invention to provide a waterproof seal 60 that is the only access point into the decal enclosure 64. Users are only able to access the decal enclosure 64 by disengaging the locking mechanism 62 and removing the cap 61. Once the cap 61 is removed, users are able to pass objects into the decal enclosure 64 through the decal opening 63. The cap 61 is a removable top for the decal enclosure 64 that is secured in place by the locking mechanism 62. Once the locking mechanism 62 is engaged, the cap 61 forms a waterproof seal 60 with the display enclosure 64. This seal 60 prevents moisture and debris from entering the decal enclosure 64 and damaging the images stored within.

In FIG. 5, an embodiment of the waterproof seal 60 is shown. Waterproofing is the process of making an object or structure waterproof or water resistant, such that it remains relatively unaffected by water or resists the ingress of water under specified conditions.

In another embodiment, the decal enclosure opens up in a hinged, clamshell manner. In this embodiment, the locking mechanism clamps the two halves of the decal enclosure shut when engaged. The decal opening is a hole traversing one end of the decal enclosure and enables objects to be placed into, or taken out of the display device.

In another preferred embodiment, the license plate connection mechanism is a fastening system that extends from the exterior surface of the display device. The license plate connection mechanism comprises a plurality of license plate fasteners, and a plurality of fastener holes. It is an aim of the present invention to provide a license plate connection mechanism that is capable of affixing the display device in a desired orientation. The plurality of license plate fasteners enables users to affix the device to the top, bottom, sides, and back of a license plate.

In an embodiment, the plurality of license plate fasteners 45, 50, 55, 80, 90 enables a user to reposition the display device while attached to a license plate. In the preferred embodiment, the plurality of fastener holes enable users to pass screws through the license plate connection mechanism and affix the device directly to a vehicle.

In another embodiment, as shown in FIG. 4, the license plate fastener may be in the form of a license plate connection mechanism appendage flap 95 which can be aligned flush with the license plate screw holes. In this embodiment, the license plate connection mechanism with display device can be affixed to the license plate utilizing the already existing screw holes in place for the license plate. The segmented portion will contain an overlapping appendage flap comprising two overlapping flaps that can rest flush against the back of the license plate and utilize the same screw holes to affix the mechanism to the license plate. These flaps available to use on all four segmented license plate connection mechanism, however the placement and size of the flaps is different where the display device is to the left or right, as opposed to top or bottom of the license plate. In all embodiments, the flaps would utilize two of the four license plate screw holes. FIG. 4 also shows the license plate connection mechanism 100 in a ridge orientation that further helps support any static image or photograph placed into the display device. This aid in stability is in addition to the decal stabilization clips. The supporting frame design allows for a message bar to be inserted by sliding along the ridges or railings in a similar fashion as the transparent container 65.

In a preferred embodiment, the supporting frame 100 can be adjusted to allow for a maximum space to accommodate longer or wider static images or text. The supporting frame may be adjusted through a plurality of electrical or mechanical means. The In another embodiment, the device is equipped with a lighting system 30 that further enables users to customize their vehicle. The lighting system may comprise LED lights, halogen, high intensity discharge, compact fluorescent, or tubular fluorescent technology for increasing visibility of the display device while the user is operating a vehicle at night or in the dark.

In another embodiment, the display device is equipped with a battery 35 and means for a digital display. In this embodiment, the device is capable of using the digital display to portray digital images and videos.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A segmented license plate connection mechanism displaying a display image or message, comprising:
    at least one display device, for positioning along a perimeter of a license plate, wherein the display device is generally in the shape of a rectangular cuboid formed by six rectangular panels, consisting of two opposing horizontal longitudinal top and bottom panels, two opposing vertical longitudinal front and rear panels, and two opposing vertical end proximal and distal panels, wherein the front panel comprises a removable rectangular transparent cover, having two longitudinal edges which are slidably conjugately insertable into two opposing horizontal channels in the top and bottom panels, and wherein the proximal panel is a removable waterproof seal, comprising a rectangular removable cap and a locking mechanism, which conjugately engages two opposing horizontal slots in the top and bottom panels and one vertical slot in the rear panel, and wherein the six rectangular panels of the display device define a decal enclosure, which is accessible through a decal opening that is formed by removing the waterproof seal by disengaging the locking mechanism and removing the cap;
    at least one decal stabilization clip located within the decal enclosure, wherein the display image or message is held securely between the decal stabilization clip and the rear panel;
    at least one overlapping appendage flap extending from the bottom panel of one of the display devices and having at least one aperture through which the overlapping appendage flap is affixed by a license plate fastener to a cooperating aperture in the license plate;
    a lighting system located on the display device to enable visibility of the display device under low light conditions;
    a USB inlet connection located on the display device; and
    wherein the display image or message is mounted within the display device and contained within the decal enclosure.

2. The segmented license plate connection mechanism of claim 1, wherein the lighting system is selected from a group consisting of LED lights, halogen, high intensity discharge, compact fluorescent, and tubular fluorescent technology.

* * * * *